United States Patent [19]

Arakawa et al.

[11] Patent Number: 4,691,811
[45] Date of Patent: Sep. 8, 1987

[54] ROTARY DAMPER

[75] Inventors: Masaru Arakawa, Chigasaki; Masanori Numata, Hayamamachi, both of Japan

[73] Assignee: Nifco Inc., Yokohama, Japan

[21] Appl. No.: 831,430

[22] Filed: Feb. 19, 1986

[30] Foreign Application Priority Data

Feb. 21, 1985 [JP] Japan .................................. 60-31418

[51] Int. Cl.⁴ .............................................. F16D 57/00
[52] U.S. Cl. .................................... 188/290; 192/58 C
[58] Field of Search ............. 188/29 D, 276; 277/96, 277/212 R; 192/58 R, 58 C

[56] References Cited

U.S. PATENT DOCUMENTS 3,211,396 10/1965 McQuillen ........................ 188/290
3,385,408 5/1968 Manning .............................. 188/290
3,861,503 1/1974 Nash ................................... 188/290
4,351,241 9/1982 Brems et al. ....................... 188/290

Primary Examiner—Duane A. Reger
Assistant Examiner—Matthew C. Graham
Attorney, Agent, or Firm—Trexler, Bushnell, Giangiorgi & Blackstone, Ltd.

[57] ABSTRACT

A rotary damper comprises a cylindrical case closed at the bottom and having a housing containing a viscous liquid, a lid mounted in the case to close the housing and having a central circular hole, and a rotor having a shaft passing through the hole of the lid, a driven gear secured to its distal end and a brake plate rotatably disposed in the viscous liquid in the housing. The central circular hole has an increased diameter portion provided adjacent to the housing, and an O-ring is fitted on the shaft of the rotor and received in the increased diameter portion such that it is radially compressed by the peripheral wall of the increased diameter portion.

1 Claim, 4 Drawing Figures

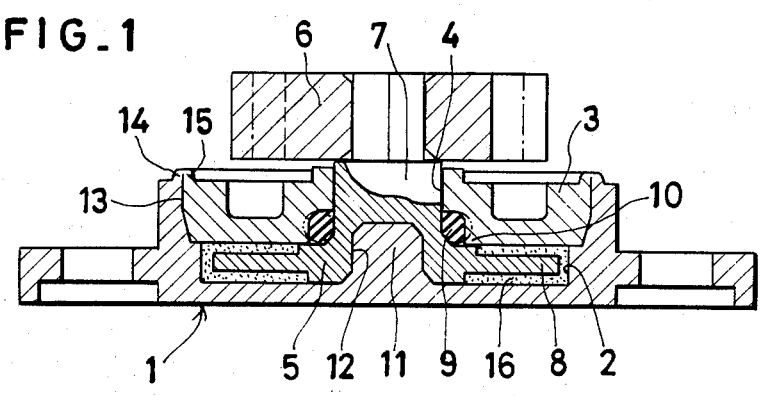
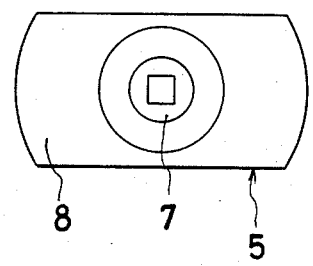
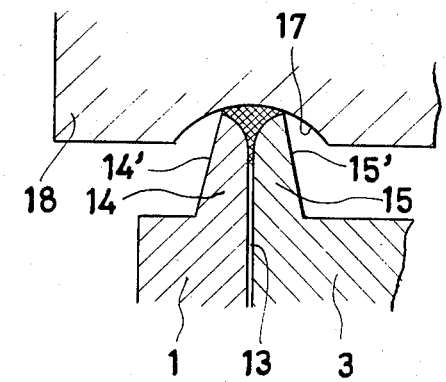
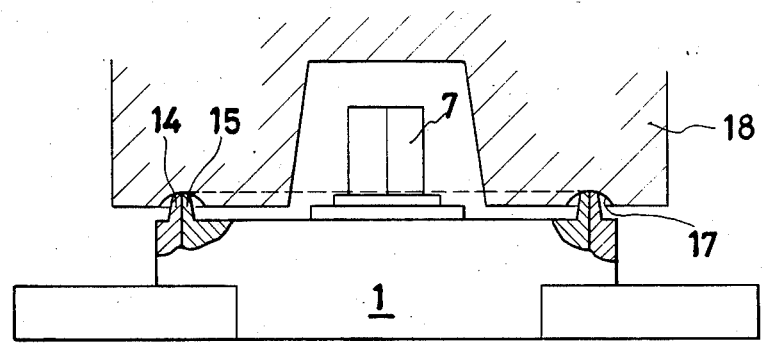

ROTARY DAMPER

FIELD OF THE INVENTION AND RELATED ART STATEMENT

This invention relates to a rotary damper, which has a driven gear meshing with a rack or a gear for braking the rack or gear by the action of a viscous liquid, e.g., grease.

Rotary dampers having various structures have hitherto been proposed. Among these rotary dampers, the one disclosed in Japanese Utility Model Application Disclosure No. Sho 53(1978)-46824 most closely resembles the structure of the rotary damper according to this invention. In this well-known rotary damper, the shaft of a rotor has a brake plate provided at one end. The brake plate is rotated in a housing containing a viscous liquid, e.g., grease. The shaft projects outwardly from the housing without any seal and is provided at its distal end with a gear meshed with a sector-shaped gear. With this structure, the viscous liquid in the housing is liable to leak to the outside from around the shaft. As a result, the amount of the viscous liquid in the housing is reduced and this reduces the braking effect.

OBJECT AND SUMMARY OF THE INVENTION

An object of the invention is to provide a rotary damper, which is simple in construction and free from deterioration of the braking effect.

To attain the above object, there is provided a rotary damper, which comprises a cylindrical case closed at the bottom and having a housing containing a viscous fluid, a lid mounted in the case to close the housing and having a central circular hole, and a rotor having a shaft passing through the hole of the lid, a driven gear secured to its distal end and a brake plate rotatably disposed in the viscous liquid in the housing, the central circular hole having an increased diameter portion provided adjacent to the housing and an O-ring being fitted on the shaft of the rotor and received in the increased diameter portion such that it is radially compressed by the peripheral wall of the increased diameter portion.

With the rotary damper according to the invention, the O-ring is fitted on the rotor shaft. The O-ring is received in the increased diameter portion of the hole penetrated by the shaft such that it is radially compressed by the periphery of the increased diameter portion of the hole. The viscous liquid in the housing for braking the rotation of the brake plate of the rotor is prevented by the O-ring from leaking to the outside along the shaft.

The above and other objects and features of the invention will become more apparent from the following description with reference to the accompanying drawings.

BRIEF DESCRIPTION OF THE DRAWINGS

FIG. 1 is a sectional view showing an embodiment of the rotary damper according to the invention;

FIG. 2 is a plan view showing a rotor of the rotary damper shown in FIG. 1;

FIG. 3 is a view for explaining the welding of cylindrical ribs of a case and a lid of the rotary damper; and FIG. 4 is an enlarged view showing how the welding of the cylindrical ribs of the case and lid progresses.

DESCRIPTION OF THE PREFERRED EMBODIMENT

Referring to the drawings, reference numeral 1 designates a cylindrical case having a housing 2 open at the top and closed at the bottom. The housing 2 accommodates a shaft 7. A brake plate 8 of a rotor 5 is provided at the proximal end of the shaft 7 and is also accommodated in the housing 2. The open end of the housing 2 is covered by a lid 3 having a central circular hole 4. The shaft 7 passes through the hole 4 and projects to the outside. A driven gear 6 is secured to the distal end of the shaft 7. The above parts are all made of plastic. An O-ring 9 is fitted on the shaft 7 adjacent to the brake plate 8. The hole 4 of the lid 3 has an increased diameter portion 10 adjacent to the housing 2. The O-ring 9 is received in the increased diameter portion 10 and is compressed radially.

In this embodiment, a cylindrical pin 11 projects from the center of the bottom of the housing 2. The proximal end of the shaft 7 is formed with a cylindrical recess 12 which snugly fits on the pin 11. The case 1 also has a lid receiving section 13 which is provided above and has a greater inner diameter than the housing 2. The lid 3 is snugly fitted in the lid receiving section 13. The case 1 has a cylindrical rib 14 projecting from its top and continuous with the inner periphery of the lid receiving section 13. The lid 3 has a similar cylindrical rib 15 projecting from its top and continous with the outer periphery thereof. The outer periphery of the rib 15 faces the inner periphery of the rib 14. The ribs 14 and 15 have substantially the same height. Their surfaces 14' and 15' other than the mating surfaces are inclined such that they are tapered upwardly.

To assemble this rotary damper, a viscous fluid 16, e.g., grease, is applied to both sides of the brake plate 8, the O-ring 9 is fitted on the shaft 7, and the brake plate 8 and the proximal end of the shaft 7 are positioned in the housing 2 of the case 1 with the recess 12 of the shaft 7 fitted on the pin 11. The lid 3 is then fitted in the lid receiving section 13 with the hole 4 of the lid 3 fitted over the shaft 7. As a result, the O-ring 9 fitted on the shaft 7 is compressed and deformed as it is pressed into the increased diameter portion 10 of the hole 4.

Then, the cylindrical ribs 14 and 15 are subjected to high frequency vibration by setting a high frequency welder horn 18 such that the bottom of an annular groove 17, which is formed in the bottom surface of the horn 18 to have an arcuate sectional profile, is urged against the top of the ribs 14 and 15. At this time, the tops of the cylindrical ribs 14 and 15 are melted by the vibration applied directly from the horn 18. In addition, both ribs are urged toward each other due to the sectional profile of the annular groove 17 and the inclination of the surfaces 14' and 15'. The melted portion flows into the gap between the facing surfaces of the two ribs and solidifies to integrally bond the ribs. The facing surfaces of the ribs are thus completely sealed together. Afterwards, the driven gear 6 is secured to the distal end of the shaft 7 which may, for example, be formed to have an angular profile.

The rotor 5 of this embodiment of the rotary damper is positioned by the engagement between the shaft 7 and the opening of the lid 3 and also by the engagement between the recess 12 of the shaft 7 and the pin 11 projecting from the center of the bottom of the housing 2. Thus, it can be rotated without vibration while it is braked by the viscous fluid 16 in the housing 2. The O-ring 9 which is received in the radially compressed state in the increased diameter portion 10 of the hole 4 prevents the viscous liquid 16 in the housing 2 from leaking to the outside along the shaft 7. Also, leakage of the viscous liquid through the gap between the facing surfaces of the ribs 14 and 15 projecting from the top of the case 1 and the lid 3 is prevented since these ribs are sealed together by their melted top portions.

The brake plate 8 of the rotor 5 in this embodiment has two diametrically opposite portions projecting from the shaft 7, as shown in FIG. 2. However, it is also possible to use a brake plate having three or more radially spaced-apart portions or to use a brake plate in the form of a disk. Further, while in the above embodiment the brake plate is integral with the shaft, it is also possible to provide the brake plate and the shaft separately such that they are rotated in unison with each other by engagement between an angular shaft and an angular hole.

Further, it is possible to provide the pin 11 at the proximal end of the shaft 7 and provide the recess 12 in the bottom of the housing 2.

According to the invention it is possible to completely prevent the leakage of the viscous liquid in the housing to the outside along the shaft of the rotor. It is thus possible to provide a rotary damper which is free from loss of braking effect due to leakage of the viscous liquid along the shaft.

Further, since the O-ring is substantially the only portion producing idle torque beyond that produced by the brake plate, the idle torque is low, the torque is stable at all times, and the durability of the damper is excellent. Thus, while the prior art damper has been usable only in places where the opening angle of the damped member is comparatively small, i.e., the stroke of the damper rotation is small, as in the lid of a radio cassette, the damper according to the invention is particularly advantageous when applied to a disk receiver for receiving a compact disk having a comparatively large rotational stroke.

What is claimed is:

1. A rotary damper comprising:
   a cylindrical case closed at the bottom and having a housing containing a viscous liquid;
   a lid mounted in said case to close said housing and having a central circular hole; and
   a rotor having a shaft passing through said hole of said lid, a driven gear secured to its distal end and a brake plate rotatably disposed in the viscous liquid in said housing;
   said central circular hole having an increased diameter counterbore portion provided adjacent to said housing opening radially inwardly toward said shaft and axially toward said brake plate, and an O-ring being fitted on said shaft of said rotor and received in said increased diameter counterbore portion such that is axially abuts said lid in said counterbore portion and is radially compressed by the peripheral wall of said increased diameter portion and is exposed axially toward and thereby engages with said brake plate as well as said shaft.

* * * * *

REEXAMINATION CERTIFICATE (3297th)
United States Patent [19]
Arakawa et al.

[11] B1 4,691,811
[45] Certificate Issued Aug. 12, 1997

[54] ROTARY DAMPER

[75] Inventors: Masaru Arakawa, Chigasaki; Masanori Numata, Hayamamachi, both of Japan

[73] Assignee: Nifco Inc., Yokohama, Japan

Reexamination Request:
No. 90/004,471, Nov. 27, 1996

Reexamination Certificate for:
Patent No.: 4,691,811
Issued: Sep. 8, 1987
Appl. No.: 831,430
Filed: Feb. 19, 1986

[30] Foreign Application Priority Data

Feb. 21, 1985 [JP] Japan ................................. 60-31418

[51] Int. Cl.⁶ ............................................... F16D 57/00
[52] U.S. Cl. ............................................... 188/290; 192/58.4
[58] Field of Search .............................. 188/290, 291, 188/292, 293, 294, 295, 296; 192/58.4, 58.1, 58.2; 277/212 R, 96, 96.1, 96.2

[56] References Cited

FOREIGN PATENT DOCUMENTS 39-2229   1/1964   Japan.
59-108843 7/1984  Japan.

*Primary Examiner*—Matthew C. Graham

[57] ABSTRACT

A rotary damper comprises a cylindrical case closed at the bottom and having a housing containing a viscous liquid, a lid mounted in the case to close the housing and having a central circular hole, and a rotor having a shaft passing through the hole of the lid, a driven gear secured to its distal end and a brake plate rotatably disposed in the viscous liquid in the housing. The central circular hole has an increased diameter portion provided adjacent to the housing, and an O-ring is fitted on the shaft of the rotor and received in the increased diameter portion such that it is radially compressed by the peripheral wall of the increased diameter portion.

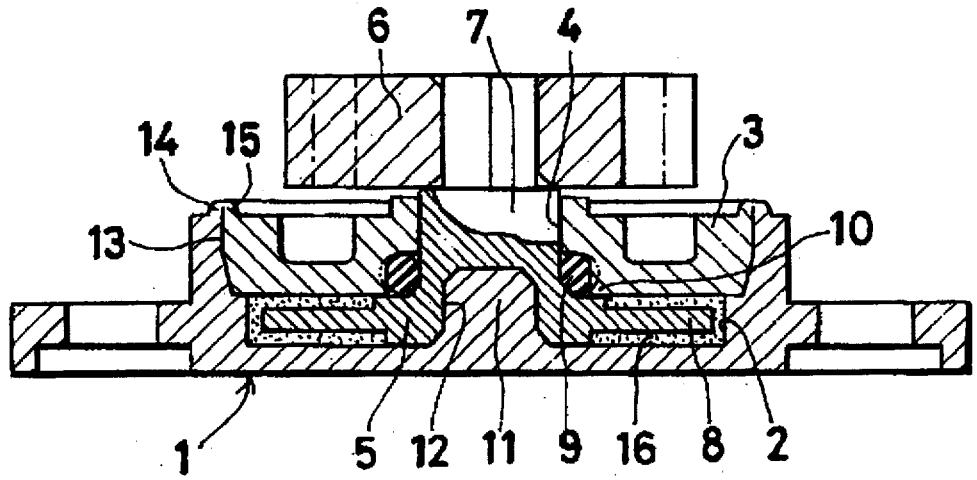

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *